US008732413B2

(12) United States Patent
Moon et al.

(10) Patent No.: US 8,732,413 B2
(45) Date of Patent: May 20, 2014

(54) METHOD AND SYSTEM FOR PRELOADING PAGE USING CONTROL FLOW

(75) Inventors: Min-Soo Moon, Hwaseong-si (KR); Chan Ik Park, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 890 days.

(21) Appl. No.: 11/833,003

(22) Filed: Aug. 2, 2007

(65) Prior Publication Data
US 2008/0184006 A1 Jul. 31, 2008

(30) Foreign Application Priority Data
Jan. 29, 2007 (KR) .................. 10-2007-0008903

(51) Int. Cl.
*G06F 12/00* (2006.01)
(52) U.S. Cl.
USPC .... 711/154; 711/165; 711/103; 711/E12.008; 711/137; 717/158; 717/159
(58) Field of Classification Search
None
See application file for complete search history.

(56) References Cited

U.S. PATENT DOCUMENTS

| 5,659,752 | A  | * | 8/1997  | Heisch et al. ................. 717/158 |
| 5,764,994 | A  | * | 6/1998  | Craft ............................ 717/159 |
| 6,226,667 | B1 | * | 5/2001  | Matthews et al. ............ 709/203 |
| 6,910,106 | B2 |   | 6/2005  | Sechrest et al. |
| 2003/0115580 | A1 | * | 6/2003  | Arai et al. ..................... 717/158 |
| 2004/0193806 | A1 | * | 9/2004  | Koga et al. .................... 711/133 |
| 2005/0044081 | A1 | * | 2/2005  | Ferguson et al. ............... 707/10 |
| 2005/0155025 | A1 | * | 7/2005  | DeWitt et al. ................ 717/158 |
| 2005/0243640 | A1 | * | 11/2005 | Rudelic et al. ................ 365/232 |
| 2006/0075394 | A1 | * | 4/2006  | Iwamoto ...................... 717/162 |
| 2007/0260862 | A1 | * | 11/2007 | McFarling .................... 712/240 |

FOREIGN PATENT DOCUMENTS

| JP | 07-152574     | 6/1995 |
| JP | 2004-133934   | 4/2004 |
| JP | 2006-048422   | 2/2006 |
| KR | 1020040031645 | 4/2004 |

OTHER PUBLICATIONS

English Abstract for Publication No. 07-152574.
English Abstract for Publication No. 1020040031645.
English Abstract for Publication No. 2004-133934.
English Abstract for Publication No. 2006-048422.

* cited by examiner

*Primary Examiner* — Matthew Bradley
*Assistant Examiner* — Arvind Talukdar
(74) *Attorney, Agent, or Firm* — F. Chau & Associates, LLC

(57) ABSTRACT

A method and system for page preloading using a control flow are provided. The method includes extracting preload page information from one or more pages in a first program code, and generating a second program code including the first program code and the extracted preload page information. The second program code is stored in non-volatile memory. When loading a page from the second program code stored in the non-volatile memory into main memory, preloading one or more pages from the non-volatile memory based on the preload page information stored in the loaded page.

16 Claims, 10 Drawing Sheets

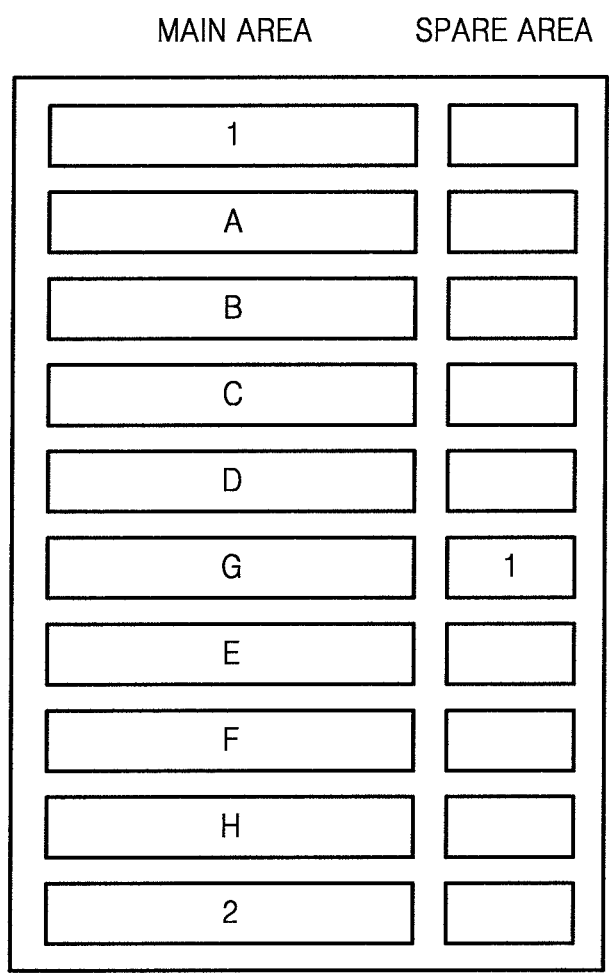

METHOD AND SYSTEM FOR PRELOADING PAGE USING CONTROL FLOW

CROSS-REFERENCE TO RELATED APPLICATION

This application claims priority to Korean Patent Application No. 10-2007-0008903, filed on Jan. 29, 2007, in the Korean Intellectual Property Office, the disclosure of which is incorporated herein in its entirety by reference.

BACKGROUND OF THE INVENTION

1. Technical Field

The present invention relates to preloading pages, and more particularly, to a method and system for preloading a page using a control flow.

2. Discussion of the Related Art

Conventional computing systems include main memory (e.g., random access memory), which can operate at high speed but can store only a small amount of information. An auxiliary storage device (e.g., a hard disk drive) can store a large amount of information but operates at a relatively low speed. A virtual memory space compensates for the limited storage space of main memory by mapping memory of the auxiliary storage device to be used as main memory.

A central processing unit (CPU) does not directly access information in the auxiliary storage device but accesses information in the main memory, and therefore, an operating system (OS) loads code of a program corresponding to a process handled by the CPU from the auxiliary storage device into the main memory. However, due to a capacity difference between the main memory and the auxiliary storage device, all of the program code corresponding to the process handled by the CPU cannot be loaded into the main memory at the same time. Accordingly, the OS loads only essential code in the main memory. When necessary code does not exist in the main memory, a page fault is generated and a necessary page is loaded from the auxiliary storage device into the main memory. In addition, the OS may perform a preload in which code to be executed by the CPU is predicted and loaded in advance.

Excessive overhead is encountered when accessing the auxiliary storage device operating at low speed. Accordingly, the number of page faults significantly affects system performance. An exact preload reduces the number of page faults.

FIG. 1 is a flowchart illustrating a path in which a program is executed. FIG. 2 illustrates an order in which code is generated when the program illustrated in FIG. 1 is compiled.

Referring to FIGS. 1 and 2, blocks A, B, C, D, E, F, G, and H illustrated in FIG. 1 may indicate code of the program, which is defined by functions. As illustrated in FIG. 1, a plurality of program execution paths may exist. For instance, there may be a path having an order of A, B, C, D, G, and A, a path having an order of A, B, E, F, G, and A, and a path having an order of A, B, E, H, G, and A. A compiler compiles the program, and compiled code may be stored in memory for storing code, for example, an auxiliary storage device (e.g., flash memory or a hard disk drive). When the program is most frequently executed in the path having the order of A, B, C, D, G, and A among the program execution paths, the compiler may store the compiled code in the auxiliary storage device in the order illustrated in FIG. 2.

A demand paging module (DPM) included in the OS may perform the preload. Usually, code can be preloaded based on code locality within the program The DPM can perform the preload using the locality when the program code is stored in the order as illustrated in FIG. 2. At this time, the code A should be executed after the code G is executed, but the DPM preloads the code E. Since the DPM cannot have information about which code is executed after the code G is executed, it performs the preload based on the locality. As a result, a page fault occurs. When the page fault occurs, program execution time is increased.

SUMMARY OF THE INVENTION

Exemplary embodiments of the present invention provide a preload method, apparatus and system for extracting information about a page to be executed that follows a currently executed code page, thereby increasing a hit ratio of preload pages and reducing program execution time.

According to exemplary embodiments of the present invention, there is provided a method for page preloading using a control flow. The method includes extracting preload page information from each page of a first program code, which includes at least one page, and generating a second program code including the first program code and the extracted preload page information. The second program code is stored in non-volatile memory. When loading one of the pages included in the second program code stored in the non-volatile memory into main memory, at least one page stored in the non-volatile memory is preloaded based on the preload page information stored in the loaded page.

The operation of extracting the preload page information and generating the second program code may include dividing the first program code into pages and searching for a branch included in each page, using a preload page extractor. A page having a high hit ratio among target pages of the searched branch is selected as a preload page of a page including the branch based on profiling information output from a test program. The preload page information including information about the selected preload page is stored in a predetermined area of the page including the branch.

The non-volatile memory may be NAND flash memory.

The predetermined area may be a spare area of the page including the branch.

The information about the preload page may be an address of the preload page.

The operation of preloading at least one of the pages stored in the non-volatile memory based on the preload page information stored in the loaded page may include searching for pages to be preloaded. A demand paging module may preload up to a predetermined number of preload pages based on the preload page information. The searched pages are preloaded into the main memory.

Searching for pages to be preloaded may include searching for preload page information stored in a page corresponding to the preload page information. Up to a predetermined number of pages may be preloaded. The method of preloading a page using a control flow may be stored in a recording medium.

According to exemplary embodiments of the present invention, a preload page extracting apparatus includes a branch manager configured to divide first program code into pages and search for a branch included in each page. A preload information extractor is configured to select a page having a high hit ratio from among target pages of the branch searched by the branch manager. The selected page is used as a preload page and includes the branch. Selection is based on profiling information output from a test program.

The preload page extracting apparatus may further include an image generator configured to generate second program code. Second program code may include information about the preload page selected by the preload information extractor in a predetermined area in each of the divided pages.

According to exemplary embodiments of the present invention, a system includes main memory and non-volatile memory. The non-volatile memory is configured to store second program code including first program code, which includes at least one page, and preload page information of each page included in the first program code. A demand paging module is configured to load at least one page, among pages included in the second program code stored in the non-volatile memory, into the main memory. When loading the one page, the demanding paging module may preload at least one page among the pages stored in the non-volatile memory based on the preload page information stored in the loaded page.

The demanding paging module may search for pages to be preloaded. Up to a predetermined number of pages may be preloaded into the main memory based on the preload page information.

The demanding paging module may search for preload page information stored in a page corresponding to the preload page information. Up to a predetermined number of preload pages may be searched. The system may include a mobile terminal

BRIEF DESCRIPTION OF THE DRAWINGS

The above and other features and aspects of the present invention will become more apparent by describing in detail exemplary embodiments thereof with reference to the attached drawings in which:

FIGS. 8A through 8C illustrate program execution paths and code stored in non-volatile memory for illustrating the method of preloading a page using a control flow, according to exemplary embodiments of the present invention.

DETAILED DESCRIPTION OF EXEMPLARY EMBODIMENTS

Figure 1:
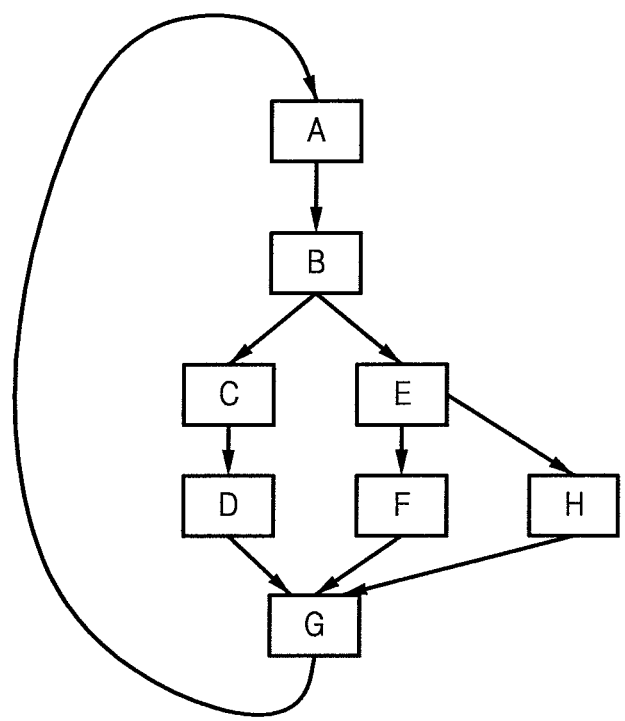
FIG. 1 is a flowchart illustrating a path in which a program is executed in related technology.
Figure 2:
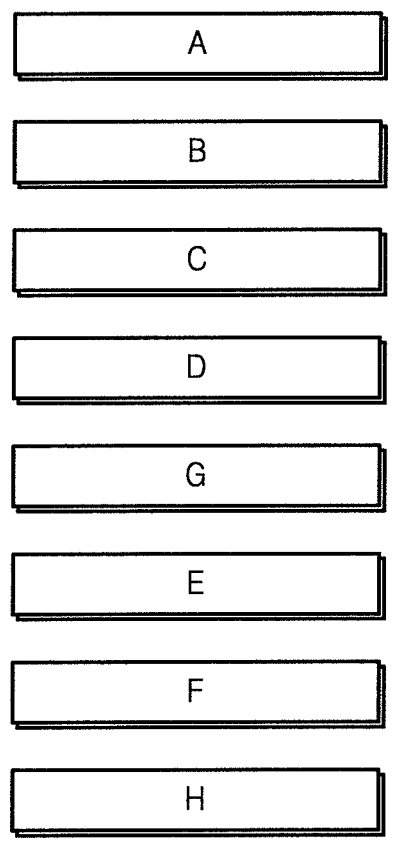
FIG. 2 illustrates an order in which code is generated when the program illustrated in FIG. 1 is compiled.

Reference will now be made in detail to the exemplary embodiments of the present invention, examples of which are illustrated in the accompanying drawings. This invention may, however, be embodied in many different forms and should not be construed as limited to the exemplary embodiments set forth herein. In the drawings, the size and relative sizes of layers and regions may be exaggerated for clarity. Like numbers may refer to like elements throughout.

It will be understood that when an element "transmits" data to another element, it can directly transmit the data to the other element or at least one intervening element may be present.

Figure 3:
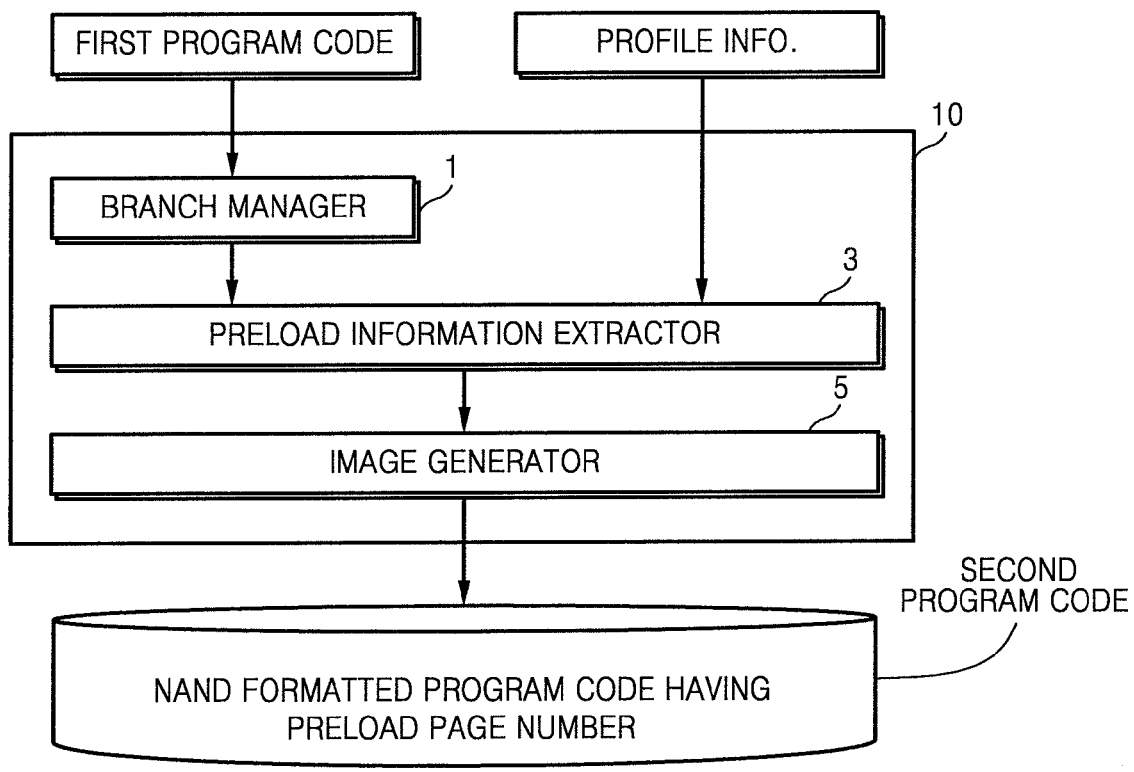
FIG. 3 is a functional block diagram of a preload page extracting apparatus according to exemplary embodiments of the present invention.

FIG. 3 is a block diagram of a preload page extracting apparatus 10 according to exemplary embodiments of the present invention. Referring to FIG. 3, the preload page extracting apparatus 10 includes a branch manager 1 and a preload information extractor 3. The preload page extracting apparatus 10 may further include an image generator 5.

In embodiments of the present invention, a system (e.g., a mobile terminal) using flash memory as an auxiliary storage device is described below, but the scope of the present invention is not restricted to the system. In addition, the preload page extracting apparatus 10 is included in a computing unit (e.g., a computer) separated from the system according to exemplary embodiments of the present invention. However, the preload page extracting apparatus 10 can be included in the system according.

The branch manager 1 may divide a first program code into pages and search for a branch included in each page. The first program code may be a compiled program code, which is stored in the auxiliary storage device (e.g., the flash memory) included in the system (e.g., the mobile terminal) and can be recognized by a central processing unit (CPU). The first program code may include at least one page. A page may indicate a data unit in which data is stored and managed in the auxiliary storage device (e.g., the flash memory) or in main memory included in the system according to embodiments of the present invention. Accordingly, the branch manager 1 may exist in the computing unit including the preload page extracting apparatus 10, receive the first program code from the computing unit (e.g., the computer), and divide the first program code into pages.

In addition, the branch manager 1 searches for the branch included in each page. Here, the branch may indicate a predetermined code (e.g., a "goto" statement or a "jump" statement) which can break the locality of the first program code. Accordingly, the branch manager 1 can increase a hit ratio in a preload by searching for the branch, for example, code that can break the locality. When a target code of the searched branch is included in the same page as the searched branch, the branch manager 1 may ignore the searched branch because the branch does not break the locality since the program code is loaded into the main memory in page units.

Usually, the branch may have a plurality of target code which branch based on a predetermined condition (e.g., an "if" statement or a "for" statement). Of the target code, one target code may be the most frequently used branch during program execution. In order to detect the target code that is most frequently used, profiling information output from a predetermined test program may be used. The test program may execute the first program code at least once and generate the profiling information, for example, statistical information such as the number of times that the branch branches and an address of a branching target code. The test program may be included in the computing unit including the preload page extracting apparatus 10 separately from the preload page extracting apparatus 10.

The preload information extractor 3 may select a page, which has a high hit ratio for example, a page including a most frequently branching target code, from among target pages of the branch searched by the branch manager 1. The selected page may be used as a preload page. The page may be selected based on the profiling information.

Figure 5:
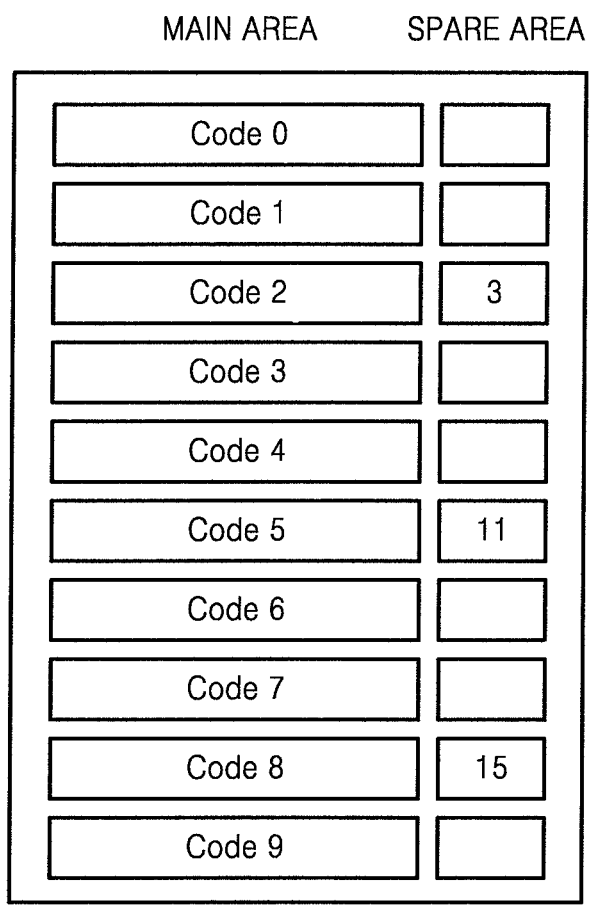
FIG. 5 illustrates a state in which program code generated by the preload page extraction apparatus are stored in non-volatile memory, according to exemplary embodiments of the present invention.

The image generator 5, which may be further included in the preload page extracting apparatus 10, may generate a second program code which includes information about the preload page selected by the preload information extractor 3 in a predetermined region in each page. The second program code may include the first program code divided into the pages and information about the preload page of each page in the first program code. The second program code may be a single code image including information such as an order in which code will be stored in the auxiliary storage device (e.g., the flash memory) and positions at which the code will be stored in the auxiliary storage device. The code image may be stored (e.g., programmed) in the auxiliary storage device as illustrated in FIG. 5.

The information about the preload page may be an address of the preload page selected by the preload information extractor 3 in each page. The address of the preload page may include information that can indicate the selected preload page. For instance, when the auxiliary storage device includes memory blocks including a plurality of pages, the address of the preload page may include an offset of a memory block including the preload page and an offset of the preload page in the memory block including the preload page. When unique page numbers are used in the auxiliary storage device, a unique page number may be the address of the preload page.

When the auxiliary storage device is implemented by NAND flash memory, the information about the preload page may be stored in a spare area of a page including the searched branch. As illustrated in FIG. 5, each page in the NAND flash memory has a spare area. The spare area need not be used in a usual file system of a system using the NAND flash memory as the auxiliary storage device, and therefore, the address of the preload page can be stored without wasting a storage area.

The present invention is not restricted to the above-described storage devices, and any storage device that can store predetermined information can be used as the auxiliary storage device. An operating system (OS) performing a preload can distinctively recognize an area in which the address of the preload page is stored and an area in which real data is stored.

Referring back to FIG. 3, the second program code generated by the image generator 5 may be stored (for example, programmed) in the auxiliary storage device of the system (e.g., the mobile terminal) according to exemplary embodiments of the present invention. The second program code may be stored as illustrated in FIG. 5.

FIG. 5 illustrates a state in which program code generated by a preload page extraction apparatus are stored in non-volatile memory, according to exemplary embodiments of the present invention. Referring to FIGS. 3 and 5, FIG. 5 illustrates a state in which the second program code generated by the preload page extracting apparatus 10 is stored in an auxiliary storage device implemented by non-volatile memory (e.g., NAND flash memory).

Code illustrated in FIG. 5 may be stored or programmed in the auxiliary storage device included in the system (e.g., the mobile terminal) according to exemplary embodiments of the present invention based on the second program code generated by the preload page extracting apparatus 10. Before finishing the manufacturing of the system, a predetermined recording device (e.g., a flash memory device) may receive the second program code from the computing unit (e.g., the computer) including the preload page extracting apparatus 10. An auxiliary storage device in which the second program code (e.g., a booting program or an OS) is recorded, may be installed in the system. In particular, since the booting program or the OS have many repetitive execution paths, a hit ratio can be increased when a preload method according to exemplary embodiments of the present invention is used.

The preload page extracting apparatus 10 may be included in the system (e.g. the mobile terminal) and generate a program code including information about a preload page with respect to a user application program which will be stored in the auxiliary storage device. In addition, the system is not restricted to the mobile terminal.

Referring to FIG. 5, there are 10 pages, and information about a preload page of each page is stored in a spare area of each of a third page "Code 2," a sixth page "Code 5," and a ninth page "Code 8". When no information is stored in a spare area of a page, e.g., a second page "Code 1", the page may not have a branch or, if the page has a branch, a target code of the branch may be included in the page, for example, the second page "Code 1" including the branch. As such, a preload page of a page, e.g., the second page "Code 1," which has no information in its spare area, may be a next page, for example, the third page "Code 2."

Figure 4:
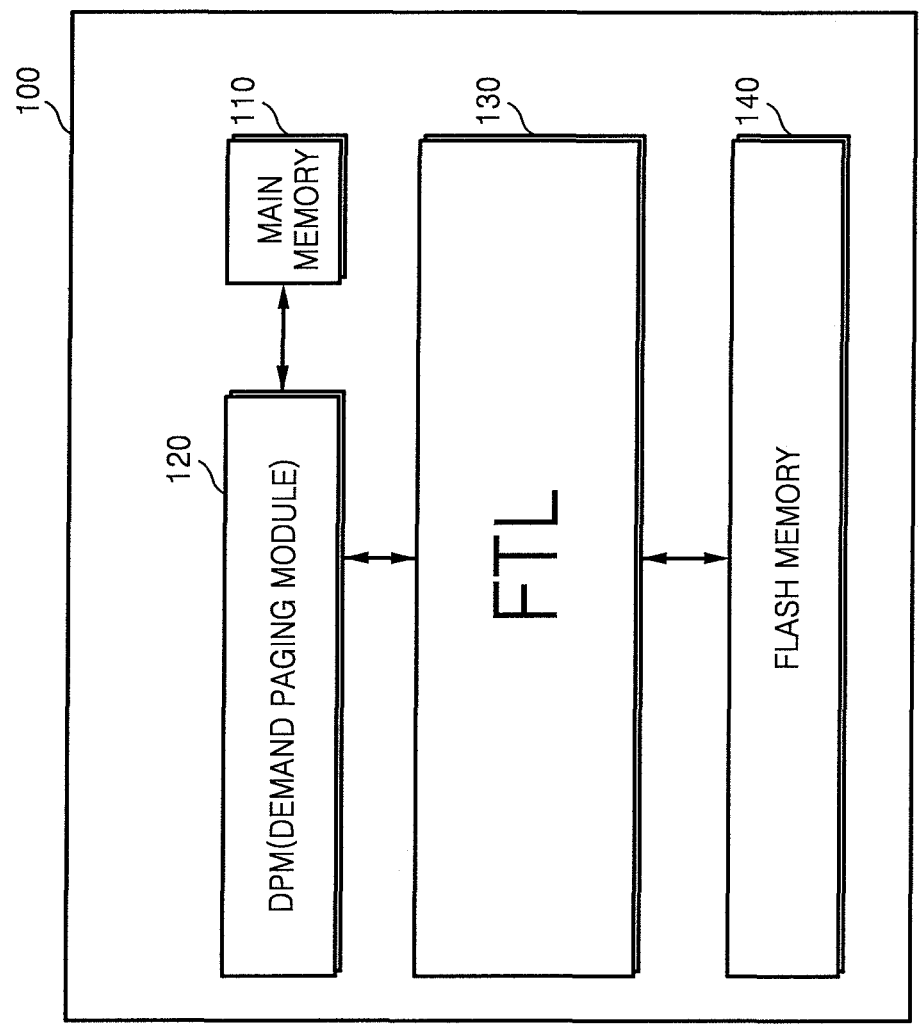
FIG. 4 is a functional block diagram of a system according to exemplary embodiments of the present invention.

FIG. 4 is a block diagram of a system 100 according to exemplary embodiments of the present invention. The system 100 includes a main memory 110, a demand paging module (DPM) 120, and a non-volatile memory 140.

The non-volatile memory 140 may be used as an auxiliary storage device. When the non-volatile memory 140 is a flash memory as illustrated in FIG. 4, the system 100 may further include a flash translation layer (FTL) 130. The system 100 may be included in a mobile terminal.

The DPM 120 may load or preload a page stored in the non-volatile memory 140 into the main memory 110. In addition, the DPM 120 may provide virtual memory space (not shown) in order to overcome the limit in the capacity of the main memory 110. The DPM 120 may be included in an OS of the system 100 and may include a DPM interface (not shown), a page fault handler (not shown), and a page cache manager (not shown).

The DPM interface may initialize the FTL 130, which will be used by the DPM 120, and prepare for page load or preload when power is supplied to the system 100. When a prefetch abort occurs because a program code to be executed does not exist in a virtual memory (not shown), the page fault, handler loads a page including the program code to be executed from the flash memory 140 to the main memory 110 and maps the main memory 110 to the virtual memory. In addition, the page fault handler may load a predetermined number of preload pages into the main memory 110 and map the preload pages to the virtual memory. During the page load, the page cache manager may unload a page that is not frequently used when the space of the main memory 110 is full to make space into which a requested page is loaded.

The FTL 130 enables a file system included in the system 100 to use the flash memory 140 and may include a sector translation layer (STL), a block management layer (BML), and a low level device driver (LLD).

The non-volatile memory, for example, the flash memory 140, may store a second program code including a first program code including at least one page and preload page information of each page in the first program code. For example, the program code illustrated in FIG. 5 may be stored in the non-volatile memory 140.

When one of the pages in the second program code stored in the non-volatile memory 140 is loaded into the main memory 110 via the FTL 130, the DPM 120 may preload at least one page among the pages stored in the non-volatile memory 140 to the main memory 110 based on preload page information stored in the one page, e.g., an address of the preload page. While loading a current program code, the DPM 120 may preload a next program code based on the preload page information.

The DPM 120 may search for pages to be preloaded, up to the predetermined number of preload pages, based on the preload page information. The searched pages may be preloaded into the main memory 110. One or more pages may be preloaded by the DPM 120 according to exemplary embodiments of the system 100. Accordingly, the number of preload pages may be predetermined or dynamically changed by the DPM 120. Therefore, the predetermined number of preload pages may be a fixed number or a dynamically variable number according to exemplary embodiments of the present invention.

For example, referring to FIG. 5, when two pages are to be preloaded by the DPM 120 and the second page "Code 1" is loaded, the DPM 120 may search preload page information stored in the spare area of the second page "Code 1." Since there is no preload page information in the spare area of the second page "Code 1" a preload page of the second page "Code 1" may be a next page, for example, the third page "Code 2." When the number of preload pages is two, the DPM 120 may search preload page information stored in the third page "Code 2." The preload page information stored in the third page "Code 2" is "3," and, a page corresponding to the preload page information "3" is a fourth page "Code 3." Accordingly, the DPM 120 may search for up to the predetermined number of preload pages, for example, two preload pages and preload the searched pages, for example, "Code 2" and "Code 3" into the main memory 110. The second page "Code 1" may be loaded and the two searched pages "Code 2" and "Code 3" may be preloaded.

When two pages are to be preloaded by the DPM 120 and the fifth page "Code 4" is loaded in FIG. 5, the DPM 120 may search preload page information stored in the spare area of the fifth page "Code 4." When there is no preload page information in the spare area of the fifth page "Code 4," a preload page of the fifth page "Code 4" may be a next page, for example, the sixth page "Code 5." When the number of preload pages is two, the DPM 120 may search preload page information stored in the sixth page "Code 5." The preload page information stored in the sixth page "Code 5" is "11," and therefore, a page corresponding to the preload page information "11" is a twelfth page "Code 11" (not shown). Accordingly, the DPM 120 may search for up to the predetermined number of preload pages, for example, two preload pages and preload the searched pages, for example, "Code 5" and "Code 11" into the main memory 110.

Figure 6:
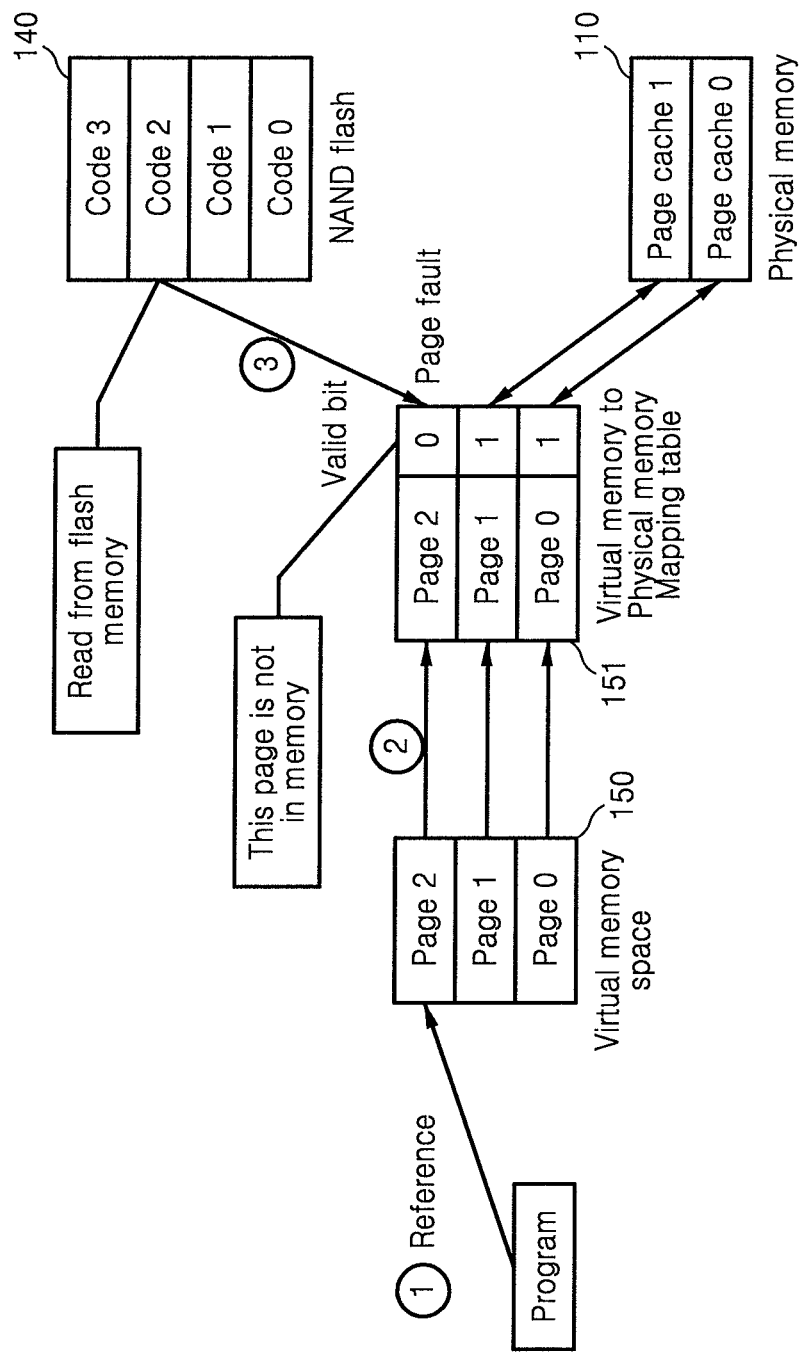
FIG. 6 is a block diagram illustrating a state before a preload in a method of preloading a page using a control flow, according to exemplary embodiments of the present invention.

FIG. 6 is a block diagram illustrating a state before a preload in a method of preloading a page using a control flow, according to exemplary embodiments of the present invention. Referring to FIGS. 4 and 6, the DPM 120 may provide a virtual memory 150 in order to augment the capacity of the main memory 110 and a mapping table 151 for mapping the virtual memory 150 to the main memory 110. The mapping table 151 may include a valid bit indicating whether a page loaded into the virtual memory 150 has been actually loaded into a physical memory, for example, the main memory 110.

A CPU (not shown) included in the system 100 refers to the virtual memory 150 in order to execute a program. When a page to be executed has been loaded into the virtual memory 150 but has not been loaded into the physical memory, for example, the main memory 110, a page fault occurs.

As illustrated in FIG. 6, when the program or the CPU executing the program accesses the virtual memory 150 to refer to a current "Page 2," a valid bit corresponding to the "Page 2" in the mapping table 151 is "0," and therefore, the "Page 2" has not been loaded into the main memory 110. As a result, a page fault occurs.

Then, the DPM 120 may load a page including "Code 2," which corresponds to the "Page 2," from the non-volatile memory 140. At this time, based on the page including "Code 2," which corresponds to the "Page 2," and preload page information stored in a predetermined area (e.g., a spare area) of the page including "Code 2," the DPM 120 may preload a page, e.g., a page including "Code 3," corresponding to the preload page information from the non-volatile memory 140. A state achieved after the preload is illustrated in FIG. 7.

Figure 7:
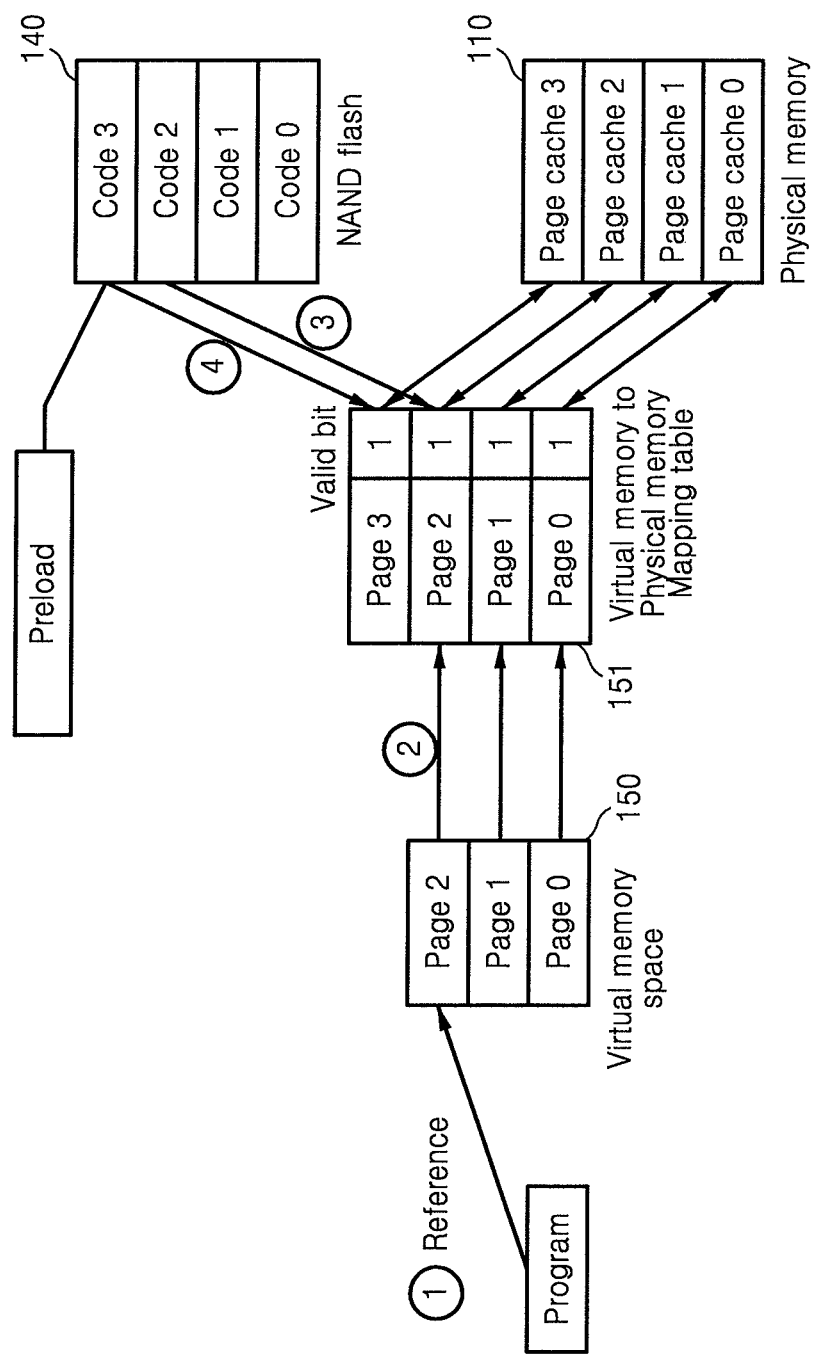
FIG. 7 is a block diagram illustrating a state after the preload in the method of preloading a page using a control flow, according to exemplary embodiments of the present invention.

FIG. 7 is a block diagram illustrating the state after the preload in the method of preloading a page using a control flow, according to exemplary embodiments of the present invention. Referring to FIG. 7, when the number of preload pages preloaded by the DPM 120 is one, the DPM 120 searches for a page to be preloaded and preloads the searched page (e.g., the page including "Code 3"). While loading the page including "Code 2," the DPM 120 may preload the page including "Code 3." As a result, pages, for example, a page "cache 2" corresponding to the page including "Code 2" and a page "cache 3" corresponding to the page including "Code 3" are loaded into the main memory 110 and the information included in the mapping table 151 changes as illustrated in FIG. 7. Therefore, when a next code is referred to after the current code (for example, "Page 2") is executed, a probability of a page fault occurring is decreased.

Figure 8A:
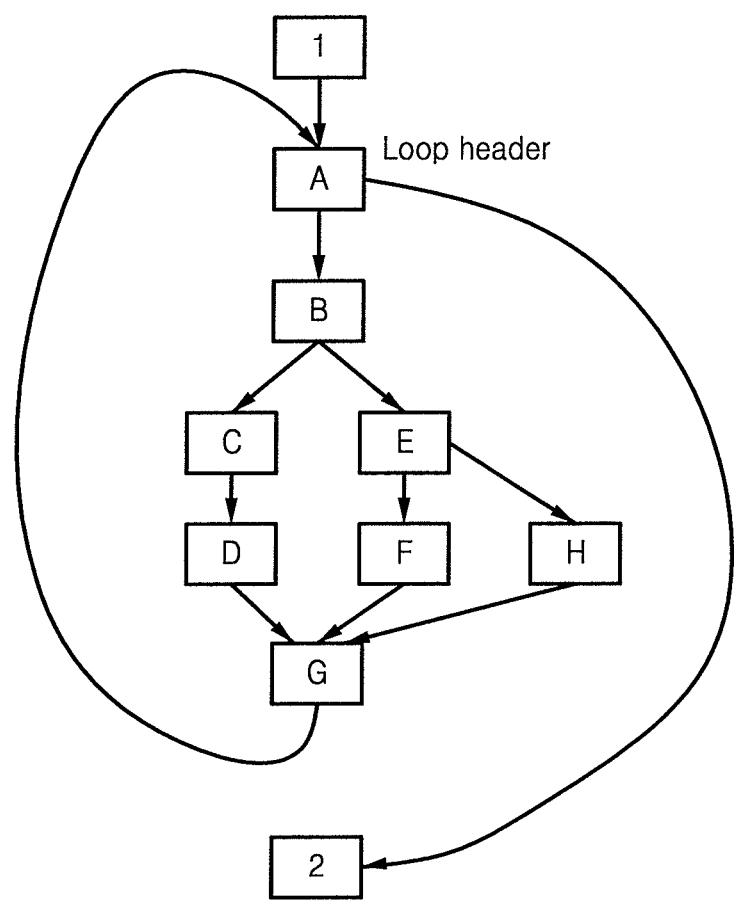
Figure 8B:
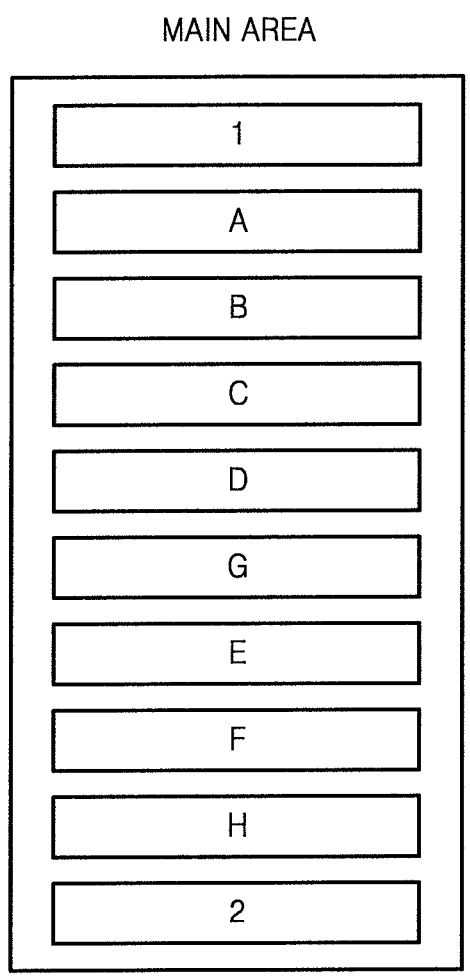

FIGS. 8A through 8C illustrate program execution paths and code stored in non-volatile memory for explaining the method of preloading a page using a control flow, according to exemplary embodiments of the present invention.

Referring to FIG. 8A, which illustrates program execution paths, when a program is frequently executed in an execution path having an order of A, B, C, D, G, and A, a compiler creates code and stores the code in a non-volatile memory in the order illustrated in FIG. 5B.

When the code illustrated in FIG. 8B is executed according to a conventional method, a DPM may preload a code E while loading a code G. However, since code A is frequently executed after code G is executed, page faults occur. However, when a method of preloading a page using a control flow according to exemplary embodiment of the present invention is used, since information about a page including a most frequently executed target code, for example, a page including code A is stored in a predetermined area, e.g., a spare area, after the code G is executed, the DPM may preload code A while loading code G. As a result, less page faults may occur.

As described above, according to exemplary embodiments of the present invention, information about a page executed following a current code page is extracted to increase a hit ratio of preload pages, and program execution time is reduced. In particular, execution time of a program, e.g., a booting program or an OS, which is repeatedly executed in similar paths, can be reduced.

While the present invention has been shown and described with reference to exemplary embodiments thereof, it will be understood by those of ordinary skill in the art that various changes in form and detail may be made herein without departing from the spirit and scope of the present invention.

What is claimed is:

1. A method for page preloading, comprising:
dividing a first program code into a plurality of pages, each page comprising a data unit in which data is stored and managed in a non-volatile memory;
searching for a branch within each page of the first program code where code locality is broken;

for each branch, selecting a target page, from among the plurality of pages and including the selection of target page and an address location of the target page into preload page position information, wherein selecting a target page includes determining, from among a plurality of target code, a most frequently branching target code based on profiling information including statistical information pertaining to a number of times that each branch, including if and for statements, branches and address information of branching target code output from a predetermined test program included in a computing unit that also includes a preload page extracting apparatus, the predetermined test program being stored separately from the preload page extracting apparatus within the computing unit;

selecting and generating a second program code comprising a single code image including the first program code and the preload page position information; and storing the single code image of the second program code in the non-volatile memory, wherein the predetermined test program executes the first program code at least once to generate the profiling information before the second program code is generated, wherein execution of program code is performed using the generated second program code, and wherein the first program code is a compiled program code.

2. The method of claim 1, wherein the non-volatile memory is NAND flash memory.

3. The method of claim 1, wherein the non-volatile memory comprises a main area and a spare area, wherein the first program code is stored in the main area of the corresponding page and the preload page position information is stored in the spare area of the corresponding page.

4. The method of claim 1, wherein the preload page position information comprises an address of the frequently executed target page.

5. The method of claim 1, wherein preloading one or more pages from the non-volatile memory based on the preload page position information stored in the loaded page comprises:
    searching for pages to be preloaded based on the preload page position information, using a demand paging module; and
    preloading the searched pages into a main memory.

6. The method of claim 5, wherein up to a predetermined number of pages may be preloaded.

7. The method of claim 6, wherein the searching for the pages to be preloaded comprises searching for preload page position information stored in a page corresponding to the preload page position information for the predetermined number of pages.

8. A non-transitory recording medium for recording a program for executing the method of claim 1.

9. A preload page extracting apparatus comprising:
    a branch manager configured to divide a first program code stored in a non-volatile memory into one or more pages, each page comprising a data unit in which data is stored and managed in the non-volatile memory and search for branches included in the pages;
    a preload information extractor configured to select a frequently executed page from among target pages of branches searched by the branch manager based on profiling information including statistical information pertaining to a number of times that each branch, including if and for statements, branches and address information of branching target code output from a predetermined test program included in a computing unit that also includes the preload page extracting apparatus, the predetermined test program being stored separately from the preload page extracting apparatus within the computing unit; and
    an image generator configured to generate a second program code comprising a single code image including the first program code and the extracted preload page position information including information about the frequently executed page selected by the preload information extractor and an address location of the page selected by the preload information extractor and store the generated second program code into the non-volatile memory, wherein the predetermined test program executes the first program code at least once to generate the profiling information before the second program code is generated, wherein execution of program code is performed using the generated second program code, and wherein the first program code is a compiled program code.

10. The preload page extracting apparatus of claim 9, wherein the generated single code image of the second program code is stored in the non-volatile memory at a predetermined area of the divided pages.

11. A system comprising:
    main memory;
    non-volatile memory, that is distinct from the main memory, configured to store a single code image of a second program code comprising a first program code including at least one page, each page comprising a data unit in which data is stored and managed in the non-volatile memory, and preload page position information including a target page selection and an address location of the target page, wherein selecting the target page includes determining, from among a plurality of target code, a most frequently branching target code, of each page included in the first program ram code based on profiling information including statistical information pertaining to a number of times that each branch, including if and for statements, branches and address information of branching target code output from a predetermined test program included in a computing unit that also includes a preload page extracting apparatus, the predetermined test program being stored separately from the preload page extracting apparatus within the computing unit; and
    a demand paging module configured to load at least one page in the second program code stored in the non-volatile memory into the main memory and to preload at least one page stored in the non-volatile memory based on the preload page position information stored in the loaded page, wherein the predetermined test program executes the first program code at least once to generate the profiling information before the second program code is generated, wherein execution of program code is performed using the generated second program code, and wherein the first program code is a compiled program code.

12. The system of claim 11, wherein, the non-volatile memory comprises a main area and a spare area, wherein the first program code is stored in the main area of the corresponding page, and the preload page position information is stored in the spare area of the corresponding page.

13. The system of claim 12, wherein the demanding paging module searches for pages to be preloaded based on the preload page position information and preloads the searched pages into the main memory.

14. The system of claim 13, wherein the demanding paging module is configured to preload up to a predetermined number of pages.

15. The system of claim 14, wherein the demanding paging module searches for preload page position information stored in a page corresponding to the preload page position information for the predetermined number of preload pages.

16. The system of claim 11, wherein the system comprises a mobile terminal.

* * * * *